the same specific surface area, exhibits a remarkably lower trend towards sintering.

3,367,741
PROCESS FOR THE PREPARATION OF BAYERITE ALUMINA
Bruno Notari, San Donato Milanese, and Mario Tolomei, Pontassieve, Italy, assignors to SNAM S.p.A., a company of Italy
No Drawing. Filed May 27, 1964, Ser. No. 370,689
Claims priority, application Italy, May 31, 1963, 11,326/63, Patent 697,117
2 Claims. (Cl. 23—143)

ABSTRACT OF THE DISCLOSURE

A process is disclosed for the production of high purity bayerite to provide an alumina-containing catalyst. A dilute solution of an aluminum chlorohydroxide, maintained at a temperature between 0° C. and 70° C., is mixed with a diluted ammonia solution and vigorously agitated. The precipitate is collected on a filter and dispersed in an aqueous ammonia solution while stirring vigorously; and this step is repeated. The filtrate is then dried. The pH of the mixed solutions is kept, during the operation, with the range from 8 to 9.

---

The present invention relates to the preparation of alumina-containing catalysts, said alumina being predominantly formed by bayerite or transition phases deriving therefrom by drying and/or firing.

Alumina, both in its hydrous form and in its anhydrous form as an aluminum oxide, is employed at large in many branches of the petroleum and chemical industries.

It has been utilized, as a catalyst or catalyst system component or also as a support for catalytically active materials in many a process of hydrocarbon conversion, and as a dehydrating agent.

It is known to all those skilled in the art that not all aluminas are equally active as catalytic agents or as a supporting material for other catalytic materials: it is thus imperative to prepare aluminas having a well defined crystalline lattice structure.

A structure which is particularly favorable for the employment as a catalyst or catalyst support is the "eta" form which is originated by cautiously firing high-purity bayerite.

The methods adopted heretofore for obtaining bayerite are:
(a) precipitation, with carbon dioxide, from solutions of aluminates;
(b) reaction between an amalgam of very pure aluminum and deionized water;
(c) hydrolysis of aluminum alcoholates.

All these methods are however jeopardized by severe drawbacks which make it difficult to put them into practice on a commercial scale.

As a matter of fact, alumina obtained from solutions of alkali-metal aluminates has proven to be of an inferior grade, its sinterization is rapid and is conducive to the formation of tabular alpha-alumina, which has no value as a catalyst: this phenomenon has been charged to the presence of a high amount of alkali-metal ions, which accelerate the sintering process.

A still further drawback of this alumina is its poor isomerizing activity.

As regards the method of preparation starting from elemental aluminum and the reaction on an amalgam thereof with deionized water, said method did not find any practical application, very presumably owing to the low reaction velocity and the exceptionally strict purity standards required both for aluminum and water.

A method which is practiced on a commercial scale is that of the hydrolysis of aluminum alcoholates, which method has been investigated in great detail. This is, however, a cumbersome method which requires the handling of enormous amounts of organic solutions of aluminum alcoholates, along with a close control of the operational conditions so as to be conductive to a chemically pure product.

The recovery of alcohol and solvents, moreover, is such as to effect the cost of the product considerably.

It is an object of the present invention to provide alumina which essentially consists of bayerite and by a method which is simpler and less expensive than those of the prior art.

A further object of this invention is to provide the preparation of an alumina which essentially consists of bayerite, and which exhibits a fair catalytic activity concurrently with satisfactory mechanical properties whenever it is employed in the conventional hydrocarbon conversion runs.

Alumina prepared according to the process of the present invention contains, as a matter of fact, a bayerite percentage which usually exceeds 99%, which fact involves that a catalyst prepared with alumina of the invention has a high selectivity, while, concurrently, the stability of the support structure stays constant throughout the whole working time of the catalyst.

On the other hand, alumina obtained according to the teachings of the present invention exhibits a porosity which is higher than 0.5 cu. cm. per gram, along with a high specific surface area.

The somewhat high porosity of said alumina does not limit, in any way, the mechanical properties; more specifically, the abrasion resistance, as defined in the example, is always less than $30 \times 10^{-6}$.

All the above objects are fulfilled by carrying out the precipitation of alumina under a close control of the operational conditions and by employing, as the starting materials, certain particular alumina compounds.

It has actually been found that it is possible to obtain an alumina exhibiting the above indicated specifications, when a partially hydrolized aluminum salt, preferably an aluminum chlorohydroxide, is precipitated with an ammonium hydroxide solution, while keeping the pH of said solution within the range from 8 to 9, with energetic stirring.

The employment of aluminum chlorohydroxide, as contrasted to aluminum chloride, affords, on the one hand, the advantage of a less extensive use of reagents, both for its preparation from elemental aluminum and for its precipitation, whereas, on the other hand, the lower concentration of chloride ions in solution remarkably shortens the alumina washing step.

Moreover, the process according to the present invention permits operating with solutions exhibiting concentrations as high as 80 grs. of alumina per liter.

More particularly, to be allowed to employ so concentrated a starting solution is a further advantageous feature from an economical viewpoint. Also as regards the temperatures which can be adopted, the latter can attain 70° C. and also this is a factor which plays a favorable role since the duration of the process is thereby shortened.

Broadly, therefore, the process of the present invention is characterized in that it starts from an aqueous solution of an aluminum chlorohydroxide having a concentration of $Al_2O_3$ (calculated) from 40 to 80 grs. per liter, the precipitation being performed at a pH kept within the range from 8 to 9, at a temperature between 0° C. and 70° C. The product thus obtained is a highly pure alumina which is of a stable form and is catalytically selective, with a porosity which generally exceeds 0.5 cu. cm. per gram, and which, as compared with aluminas having lower porosity values, affords the advantage that, the weights being equal, it occupies a lesser volume entailing a lower expenditure for the catalyst loadings, and which, eventually, exhibits very satisfactory mechanical properties, since its resistance to abrasion (to be defined hereinafter) is of the order of magnitude of $30 \times 10^{-6}$ and at any rate does not exceed said value.

Whenever all these conditions are fulfilled, it has been found that the precipitate predominantly consists of bayerite; furthermore the aging time is reduced to a few short hours, the processing time being accordingly shortened thereby.

A further advantage to the ends of the cheapness of the process has been achieved by utilizing, in the present process, aluminum salt solutions wherein a part of the anions is replaced by hydroxyl ions $OH^-$. The ratio of the aluminum equivalents to the anion equivalents is therefore higher than 1 (unity), this fact entailing noticeable savings both of starting materials and precipitants.

The use of the chloride anion is of particular interest: the aluminum chlorohydroxide solutions have been prepared in, and described in the technical literature of, the last century (L. Liecthi and W. Suida, Dingler's Journal, 251, 177 (1883), P. Hautefeuille and A. Perrey, Compt. Rend. 100, 1219 (1885), D. Tommasi, Bull. Soc. Chim. (2), 17, 26 (1872)). In general, the method consists in dissolving aluminum hydroxides into solutions of hydrogen chloride or of aluminum chloride, or also in reacting activated elemental aluminum with aluminum chloride or hydrogen chloride solutions.

The ratio of aluminum equivalents to chlorine equivalents is preferably comprised within the range 3–7; too high a ratio, in spite of its being cheaper, makes the aluminum chlorohydroxide poorly stable and may be conducive to the precipitation of alumina in the "sol" storage tank.

The preparation of the aluminum chlorohydroxide solution is of advantage; as a matter of fact, due to that which has already been said as to the detrimental influence of sodium and alkali-metals, it is convenient, in the preparation of aluminum salts and aluminas to be used as catalysts, to resort to elemental aluminum which is readily available in the required purity grade, the purification of aluminum salts being conversely much more cumbersome and expensive.

A few examples, which illustrate the results achieved when operating after the teachings of the present invention, are now reported, no limitation of the invention being implied thereby.

EXAMPLE 1

A 5,000-ml. flask is charged with 500 grs. elemental Al, 2,400 mls. distilled water, 1,000 mls. of a 36.4% solution of HCl, and 1 gr. Hg $Cl_2$.

Heat is administered to the flask (equipped with a reflux condenser), until all the aluminum has been thoroughly dissolved. To the thusly obtained aluminum chlorohydroxide solution there are added 150 liters of distilled water and a diluted solution of ammonia (1:100) is added thereto with energetic stirring until reaching a pH of 9.

The precipitate is collected on a filter, then transferred to a vessel containing 30 liters of a pH 9 aqueous solution of ammonia, whereafter it is dispersed with energetic stirring. After 16 hours this step is repeated until chloride ions have been completely discharged from the washings, still keeping to pH 9. After 16 additional hours, a filtering step is performed and the cake is dried at 100° C. The product exhibits the following X-ray structure of 99% bayerite. An alumina obtained by extruding the cake after the filtration, and calcined during 5 hours at 500° C., has the following specifications:

Specific surface: 265 sq. meters per gram.
Overall porosity: 0.552 cu. cm. per gram.
Average pore diameter: 83 Angstrom units.
Abrasion resistance: $K = 30 \times 10^{-6}$.

Abrasion resistance has been measured according to the Kramm and Stone method, as disclosed in Analytical Chemistry, 35, No. 3, March 1963, pages 38–315.

This example is illustrative of the precipitation of an aluminum chlorohydroxide with ammonia and of the obtention of pure bayerite with reduced reagent waste.

EXAMPLE 2

An aluminum chlorohydroxide solution, prepared according to Example 1, is diluted into 40 liters deionized water and heated to 60° C. A 1% ammonia solution, previously heated to the same temperature, is added with stirring until a pH of 9 is attained. The thusly obtained precipitate is collected on a filter, transferred into a container, wherein 30 liters of an aqueous ammonia solution, having a pH of 8.9 and having been heated to 60° C., are added thereto, whereafter the precipitate is dispersed with energetic stirring and collected on a filter again. This step is repeated until all the chloride ions have been discharged. The precipitate is now poured into an aqueous ammonia solution having a pH of 8.9 at 60° C., and, after 16 hrs. the precipitate is centrifuged. The precipitate, subjected to X-ray analysis, exhibits a bayerite structure having a 99% purity.

This example is illustrative of the precipitation of an aluminum chlorohydroxide with ammonia at 60° C. as a concentrated solution, pure bayerite having been obtained within a short aging period.

What is claimed is:

1. A process for the preparation of high-purity bayerite having an overall porosity not lower than 0.5 cu. cm. per gram and an abrasion resistance coefficient "K" as hereinbefore defined not higher than $30 \times 10^{-6}$, and having a specific surface area not less than 200 sq. meters per gram, comprising mixing with a diluted solution of an aluminum chlorohydroxide, maintained at a temperature between 0° C. and 70° C., a diluted ammonia solution, and vigorously agitating the combined solutions, collecting the precipitate, dispersing it in an aqueous solution of ammonia while stirring vigorously, and repeating this step until bayerite of the desired purity is obtained, filtering, and then drying the filtrate, the pH of the solutions being kept, during progress and on completion of the precipitation, within the range from 8 to 9.

2. A process according to claim 1, wherein the aluminum chlorohydroxide in the diluted solution has a concentration, expressed in terms of $Al_2O_3$, ranging between 40 and 80 grs. per liter.

References Cited

UNITED STATES PATENTS

| 2,787,522 | 4/1957 | Lefrancois | 23—143 |
| 3,096,154 | 7/1963 | Stewart | 23—143 |
| 3,188,174 | 6/1965 | Kehl et al. | 23—143 |

FOREIGN PATENTS 629,387   10/1961   Canada.

OTHER REFERENCES

Newsome et al. "Alumina Properties," Aluminum Company of America, Pittsburgh, Pa. (1960), page 48.

EDWARD J. MEROS, Primary Examiner.

OSCAR R. VERTIZ, Examiner.

G. T. OZAKI, Assistant Examiner.